Figure 1:
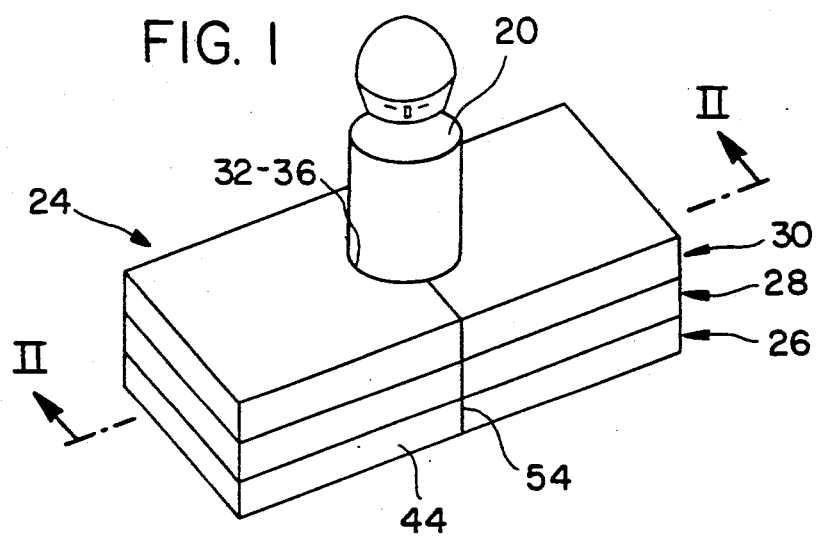

United States Patent [19]

Schmitz et al.

[11] Patent Number: 5,071,355
[45] Date of Patent: Dec. 10, 1991

[54] DEMONSTRATION DEVICE

[76] Inventors: Karl-Werner Schmitz, Im Rheinwinkel 20, D-5000 Köln 90; Manfred Bergfelder, Gimborner Weg 3, D-5000 Köln 80, both of Fed. Rep. of Germany

[21] Appl. No.: 499,259
[22] PCT Filed: Nov. 26, 1988
[86] PCT No.: PCT/EP88/01086
§ 371 Date: Jun. 1, 1990
§ 102(e) Date: Jun. 1, 1990
[87] PCT Pub. No.: WO89/05178
PCT Pub. Date: Jun. 15, 1989

[30] Foreign Application Priority Data

Dec. 2, 1987 [DE] Fed. Rep. of Germany ... 8715916[U]

[51] Int. Cl.$^5$ .............................................. G09B 19/00
[52] U.S. Cl. .................................... 434/433; 273/450; 446/268
[58] Field of Search ................ 434/433, 211; 273/449, 273/450; 446/117, 85, 256, 268

[56] References Cited

U.S. PATENT DOCUMENTS

| 206,142 | 7/1878 | Sibley et al. | 446/256 X |
| 2,109,965 | 3/1938 | Booth | 446/98 |
| 3,512,775 | 5/1970 | Harvey . | |
| 4,211,029 | 7/1980 | Cretin | 446/117 |
| 4,820,234 | 4/1989 | Isaf | 446/117 X |

FOREIGN PATENT DOCUMENTS 8610110 8/1986 Fed. Rep. of Germany .

Primary Examiner—Richard J. Apley
Assistant Examiner—Rachel M. Healey
Attorney, Agent, or Firm—Eckert Seamans Cherin & Mellott

[57] ABSTRACT

A demonstration appliance has a human figure comprising a head region, a foot region with a convex downward or pointed foot surface, and a block whose height matches that of the foot region. The block comprises at least two, preferably three, superimposed separable layers and has an upward-opening recess for receiving the foot region. Said recess is formed by an opening in each layer. The opening in the first layer has an overdimension with respect to and around the lower part of the foot region which is lodged in the first layer, such that the latter alone loosely holds the foot region and, hence the figure, and, in the event of shaking, for example if the figure is lightly tapped, will not prevent tilting. The shape of the opening in the other layer is adapted to the corresponding part of the foot region so that the foot region lodged in the openings of the superimposed layers cannot be tilted from the vertical through an angle greater than +/−10°. Each layer comprises at least two modules each having an undercut-free recess on one side. These recesses form the opening of a layer when the modules are combined.

12 Claims, 3 Drawing Sheets

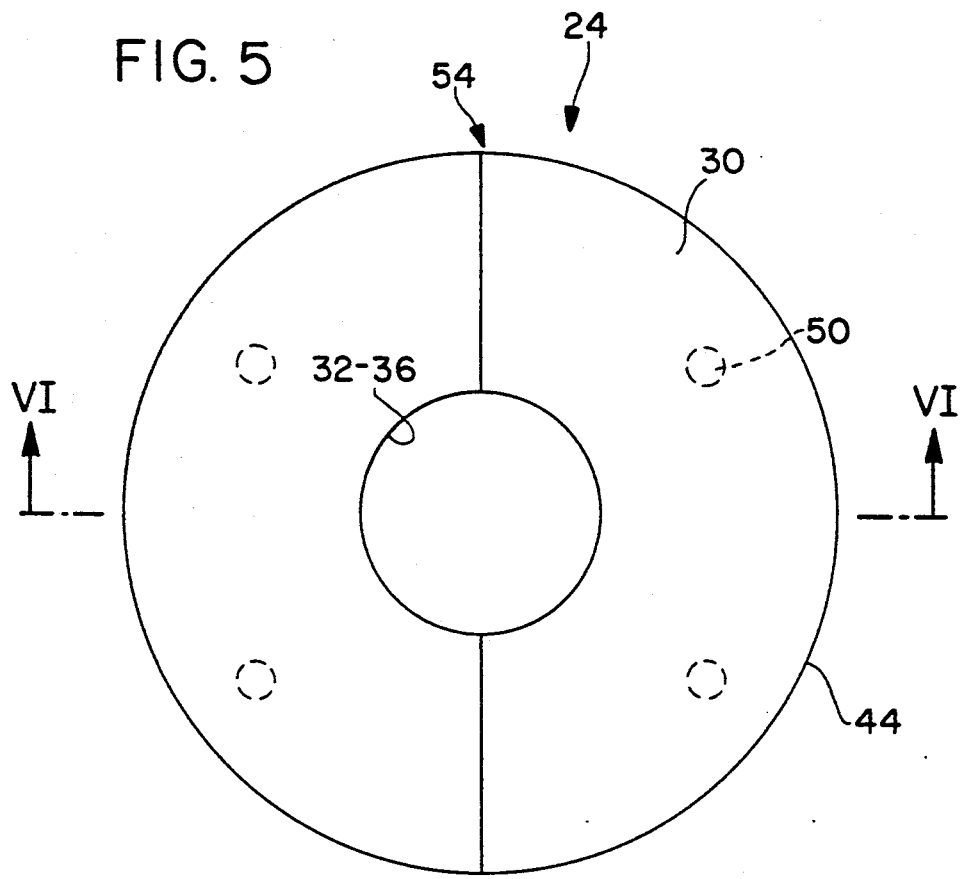
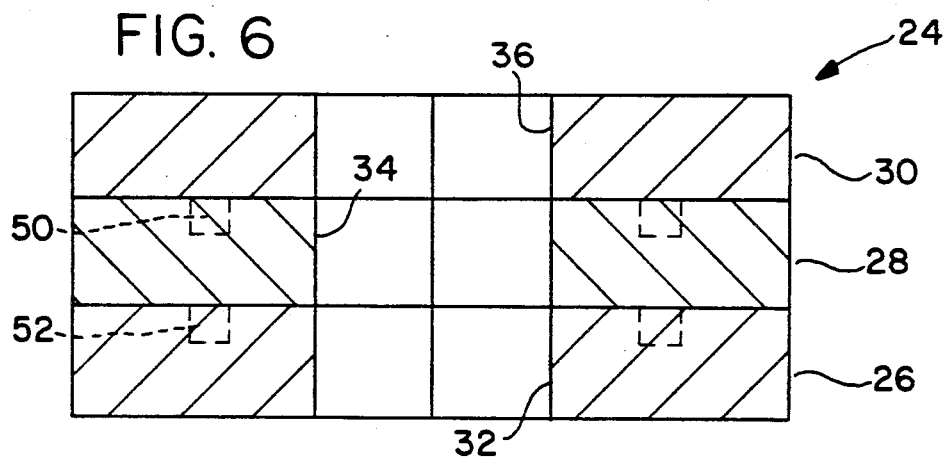

DEMONSTRATION DEVICE

The invention pertains to a demonstration device. Such devices have, on the one hand a game purpose; they should stimulate the players to handle them and they should be gladly grasped and used. On the other hand, they should also, however, convey a message, especially a teaching subject. This results from the special shape of the demonstration device and can be varied within a certain range of various teaching subjects which, however, have similar objectives.

When the demonstration device is played with, the teaching subject should be distinguished as clearly as possible without however, being the primary goal. The game should be useful for being able to represent the teaching subject and thus the message in another manner and possibly more comprehensibly than is possible by an oral explanation, a written description or a drawing, all of which concern the same teaching subject. When the teacher uses the demonstration device he can make the messages connected with this device more understandable to the learner. In this case, the demonstration device lying in the hand of the teacher facilitates the lecture; the game compels the speakers to address the individual parts or individual elements of the demonstration device so that the subject to be conveyed comes into discussion., to that extent the demonstration device also functions as a lecture plan. When the learner uses the demonstration device, he can comprehend the message physically, by means of which the learning effect is reinforced. In this respect, a demonstration device of the type mentioned above makes use of the experience that an exclusively oral presentation of the teaching subject, a visual presentation of the teaching subject or a combination of oral and visual presentation of knowledge have a lower probability of being permanently absorbed by the learner than a message provided in a game which is physically held with the hands, that is, haptic learning.

Thus, the task of the invention was to offer a demonstration device, with which gradually better protection of a human figure against tilting, that is by an increasingly improved support, can be represented. Such a demonstration device is suitable, for example, for explaining the protection of a person by gradually improved insurance protection; the device is suitable for explaining the gradually improved stability of a person against attacks which could make it tilt. In addition to the insurance protection mentioned above, the professional insurance of a person to be gradually improved can thus be explained, that is, how this person can obtain it by profession-promoting measures, for example, training, and it can represent quite generally the development of a person towards a maturing process or the like.

The task is solved by a demonstration device, which is characterized by a human figure which has a head area and a foot area, which has a foot surface that is convex or pointed downwards, and by a block, the height of which is adapted to the height of the foot area, which is comprised of at least two and preferably three layers that can be stacked one above the other and which has a recess opening upwards for mounting the foot area, which recess is formed by an opening in each layer, whereby the opening of the first layer has such an excess (free space) on all sides opposite the lower part of the foot area contained by it, which part alone holds the first layer, the foot area and thus the figure only unstably, and in the case of vibration, e.g., in the case of a slight push against the figure cannot hold against tilting, and the opening of the other layer is adapted in a mold-like manner to the part of the foot area corresponding to it such that the foot area contained by the openings of the layers stacked one above the other cannot be tilted in an angular range greater than ±10° from the vertical lines, and in that each layer is comprised of at least two components, which have, in each case, an undercut-free groove on one side, and these grooves form the opening when the components of a layer are put together.

In a preferred design of the demonstration device, the device is characterized by a human figure which has a head area and a foot area which has a foot surface that is convex or pointed downwards, and by a block, the height of which is adapted to the height of the foot area, which is comprised of components arranged in three layers that can be stacked one above the other, and which has a recess opening upwards for mounting the foot area, which is formed by an opening in each layer, in which a) the opening of the first layer has an excess on all sides opposite the lower part of the foot area contained by it, which alone cannot hold the first layer, the foot area and thus the figure against tilting, b) an air gap remains on all sides between the opening of the second layer and the corresponding part of the foot area, which is designed such that the foot area contained by the first and second layers which are stacked one above the other can be tilted in an angular range smaller than ±80° C., preferably smaller than ±45°, opposite the vertical lines within the opening; however, at a greater tilt angle, a closing shape appears between these openings and the foot area and c) the opening of the third layer is adapted in a mold-like manner to the part of the foot area corresponding to it such that the foot area contained by the openings of the three layers which are stacked one above the other cannot be tilted in an angular range greater than ±10° from the vertical lines.

In en embodiment of the demonstration device according to the invention as a teaching and learning game for the protection of a person by various types of insurance, the block represents the personal capability of the person symbolized by the figure. The various types of insurance which are required for complete protection are indicated on one lateral surface of each individual layer, and the term "work capacity" is applied to the opposite lateral surface. When an insurance representative takes the demonstration device in his hand, he should extend and thus display the individual layers one after the other, and he explains that, with a decrease in or even a cessation of the work capacity, the standing capacity of the human being also becomes questionable. Finally, the insurance customer should then again assemble the block and thus comprehend how the stability of the human figure is increasingly improved.

When playing, by stacking the layers one above the other, the human figure represented by a figurine is supported increasingly better against tilting movements which should symbolize attacks to be expected in the life of this person. If all three layers are assembled, then the figure is prevented from tilting; therefore, the figure cannot be moved from its vertical position by a push acting on it from outside. If the top layer is removed by removing the components that form this top layer, then a tilting movement of the figure is possible within a cone; the figure can thus tilt, but it is held within a predetermined angular range, and thus, it cannot completely tilt over. If the second layer is also removed by removing the corresponding components, then the figure is only supported inadequately. Of course, it can be placed upright, but it is unstable and completely falls over at a slight lateral push and therefore is practically not held by the first layer. Without the first layer, the figure is completely unstable, and it cannot be made to stand.

In the preferred design of the demonstration device according to the invention as a learning game for explaining the gradually improved protection of a person by gradually improved insurance protection, the demonstration first starts with the figurine in the form of a human figure alone without the block. It is not possible to stand the figure upright. A first attempt of protection for the figure is obtained only in that the first layer is provided. A first attempt of protection for the figure is obtained only in that the first layer is provided [sic]. The first layer comprises the foot area of the figure, by means of which a visible support of the figure is obtained; however, the support is not yet sufficient to be able to exclude a complete tilting of the figure. In this case, the figure does not fall onto the free, empty surface, but rather onto the first layer; altogether, a certain protection is produced by the first layer, which, however—as is obtained immediately by playing—is not sufficient. If the second layer is now placed onto the first layer, not only is a visibly better support of the foot area of the figure obtained, but also the angle, at which the figure can be moved from the vertical lines if it is pushed, is limited. The opening of the second layer is adjusted on the foot area such that the figure can only be moved in an angular range. It is protected against completely falling over, but is not yet protected to the extent that it would also continually be held in the vertical lines if it is pushed. This is first obtained by applying the third layer. This third layer comprises the foot area of the figure such that the figure can no longer be tilted out of the vertical lines even if it is pushed, i.e., it is now stable against heavy blows and thus sufficiently protected. The individual components which form the block can be inscribed or characterized such that they specify certain types of insurance. The necessary stability is gradually obtained by arranging the various insurances in layers.

It is advantageous to design the layers with the same height in each case.

In a further development of the invention, it is suggested to design the crowning of the foot area within the first layer so that the rotationally symmetrical contour remains within a semicircle with the radius of the opening of the first layer. By this means, it is guaranteed that the figure—similar to a ball-and-socket joint—can be tilted opposite the first layer; in this case, however, when it falls over, it falls on the first layer.

In another improvement it is suggested that each layer comprise two components having equal areas, and when put together, they come into contact with the diametrical line of the opening of the respective layer. This construction makes it possible to gradually construct the protection of the figure without the figure itself having to be moved. The block can comprise a total of six components, all of which have the same areas under one another and have essentially the same shape. By this means, the demonstration device has a clarity and simple design which also has a positive effect esthetically. However, the components of the individual layers should differ from one another such that they cannot be interchanged with one another, that is, for example, a component of the first layer is not erroneously used for the second layer. In order to achieve this, it is suggested in an improvement that the individual components of each layer be designed by form projections and corresponding recesses in the other component, by the arrangement of magnets, by an adhesive or the like, such that a false layering is not possible; in any case, it cannot lead to a complete block.

In a preferred design, the block is a straight prism; it is preferably cube-shaped or cylindrical. The mold-like clear and simple design of the block does not distract from the teaching subject to be conveyed and makes possible an esthetically good shape of the block. The individual components develop a simple basic shape, by means of which, in turn, their production and also the assembly are made easy.

Finally, in the area of the foot surface, a nonplanar flattening can be provided, which is designed such that the figure alone can be mounted vertically on a horizontal base with some aptitude. However, since the flattening is designed very small, this condition is essentially unstable, and the figure tilts over upon the slightest vibration.

Figure 2:
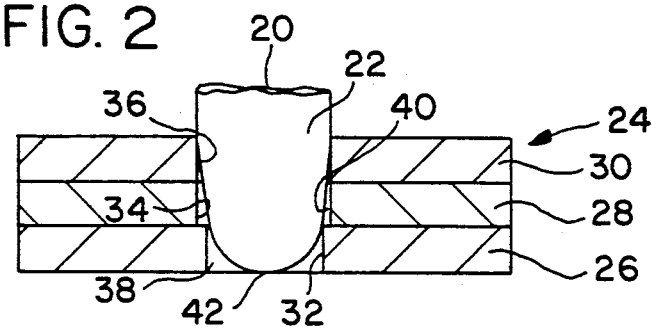
Figure 3:
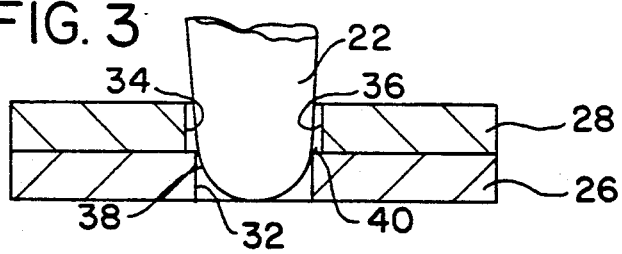
Figure 4:
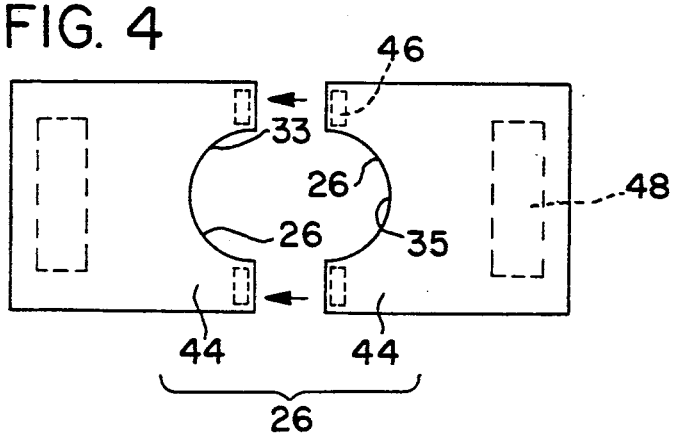
Figure 7:
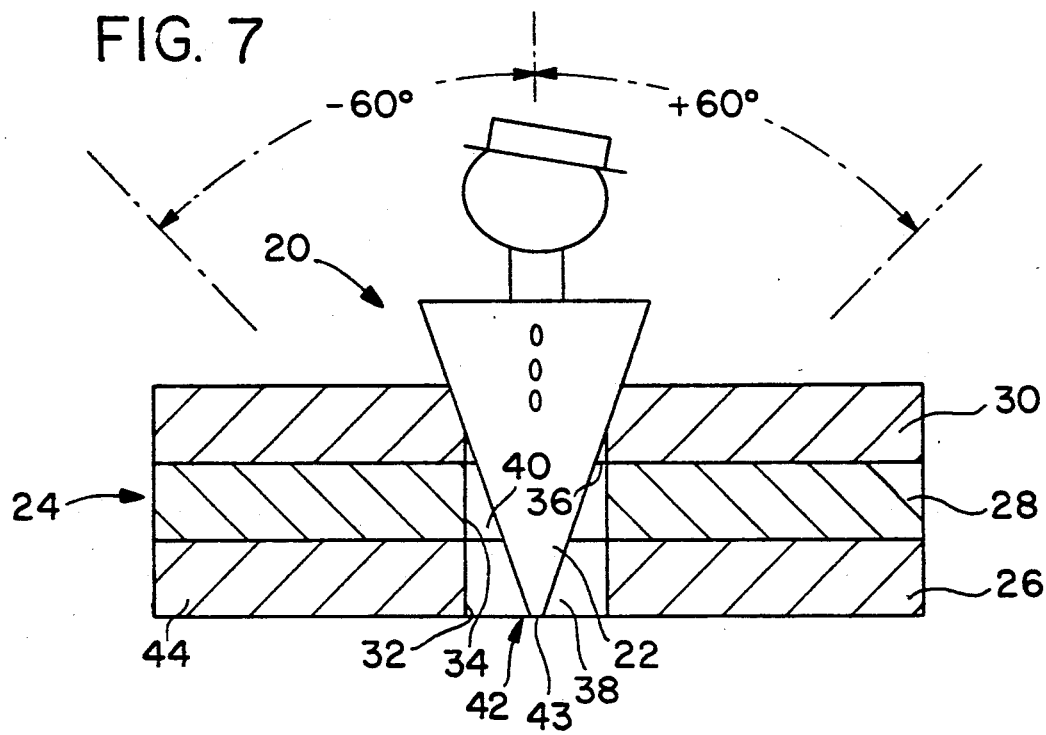
Figure 8:
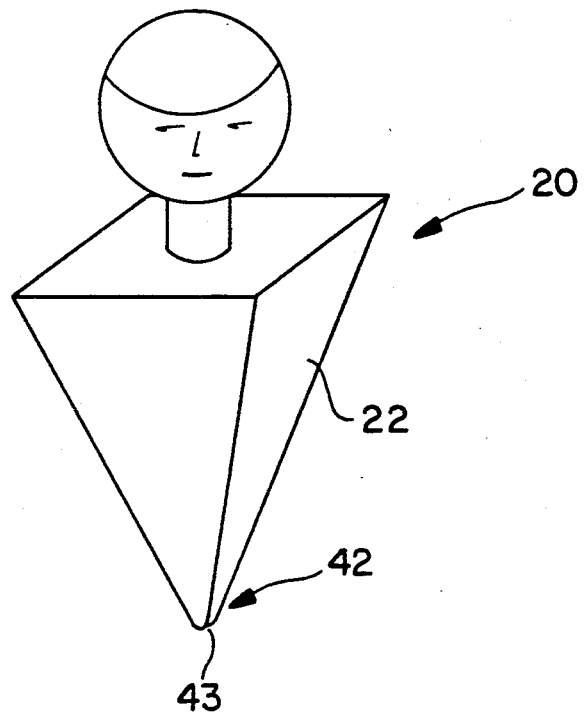

Additional advantages and characteristics of the invention are inferred from the remaining claims as well as from the exemplary embodiments of the invention which are to be understood as not limiting the description below and which are described in detail with reference to the drawings. In the drawings:

FIG. 1 shows a perspective representation of the demonstration device with a three-layered block which receives the foot area of a figure, FIG. 2 shows a section along the intersection line II—II of FIG. 1, FIG. 3 shows a section corresponding to FIG. 2, but including the top (third) layer, FIG. 4 shows a top view of the two components of a first layer, FIG. 5 shows a top view of a block in cylinder form (without human figure), FIG. 6 shows a section along the intersection line VI—VI of FIG. 5, FIG. 7 shows a sectional view corresponding to FIG. 2, but with a cone-shaped foot area and FIG. 8 shows a perspective representation of the figure with a pyramid-shaped foot area.

The demonstration device consists of a human FIG. 20 in the form of a figurine which, in the exemplary embodiment shown, has not only a rotationally symmetrical foot area 22, but is also extensively rotationally symmetrical. The completely assembled demonstration device, as is evident from FIG. 1, also consists of a block 24, which has a cube shape in the exemplary embodiment according to FIGS. 1 to 4 and a cylinder shape in the exemplary embodiment according to FIGS. 5 and 6 Other shapes, especially straight prisms with six-sided bases, oval bases or the like are possible. The height of the foot area 22 corresponds to the height of the block 24 and amounts to about 30 to 50 percent of the total height of the FIG. 20. As the "foot area" is understood that part of the FIG. 20 which is contained by the block 24, regardless of the actual proportions or data. The block 24 is comprised of three layers 26 to 30 which can be stacked one above the other and have the same height, with each layer being comprised of two components, as they are especially evident in FIG. 4

The block 24 has a recess opening upwards which is almost cylindrical in the exemplary embodiments and is formed by openings 32 to 36, of almost the same size, in the individual layers 26 to 30. The foot area 22 of the FIG. 20 is adapted to this recess 32 to 36.

Up to the level of the first layer 26, the foot area is designed as partially spherical, with the spherical radius being somewhat smaller than the radius of the orbicular opening 32 of the first layer. The height of the first layer 26 is smaller than this radius. As is evident in FIGS. 2 and 3, by this means there is, on the upper edge of the opening 32 of the first layer 26, a certain contact with the partially spherical lower part of the foot area 22, such that a certain support is obtained, however, the support obtained is unstable, and the FIG. 20 falls over upon the slightest push, that is, onto the first layer 26.

In the area of the second layer 28, the foot area is essentially shaped like a truncated cone; an annular air gap 40 remains between the opening 34 and this part of the foot area 22. This is designed such that the FIG. 20 can be moved within a certain angular range, thus within a cone. This is shown especially in FIG. 3, in which it is evident that the foot area 22 is not in contact with the opening 34 on all sides. If the FIG. 20 is pushed into the position shown, then it tilts somewhat, but is then held, that is, it does not fall over completely. In this case, it is characteristic that a certain frictional engagement, but not a closing shape, is not obtained as in the combined effect between the foot area and only the first layer 26, but rather that here when the FIG. 20 is tilted by the angular range indicated, the foot area jackknifes until it is caught within the cooperating openings 32, 34, that is, it is protected against further tilting.

Even in the area of the third layer 30, the foot area is conical, with the conical form being continued. This is designed such that the third layer 30 is adjacent practically without play with its upper edge on the foot area 22, as is evident in FIG. 2. A tilting movement of the FIG. 20 is practically impossible, in any case very limited, under these conditions.

In the bottom area, the FIG. 20 can have, on the position 42, a small-plane insert with high friction for example, a small piece of rubber, which projects only very slightly opposite the partially spherical contour. Corresponding to FIG. 4, if the third layer is removed or even the second and the third layers are removed, a certain stability of the FIG. 20 against vibrations is produced.

Instead of the almost cylindrical opening 32 to 36, as it is evident in the exemplary embodiments, the foot area 22 can be designed exactly cylindrical or the opening 32 to 36 can extend upwards. It is also not necessary to design the opening 32 of the first layer as continuous; it can therefore be closed at the bottom, as long as it is guaranteed that by this means no mold-like hold of the FIG. 20 is obtained. If the bottom of the opening 32 of the first layer is adapted, for example, in the form of a tub or the conical form of the crowned part of the foot area 22, a certain frictional engagement is obtained, which functions similar to the position 42.

As was explained above, each layer 26 to 30 consists of two components 44 which are adjacent to a diametrical line of the opening 32 to 36 in the assembled state. FIG. 4 shows the condition of the bottom layer 26 before the two components 44 are connected. The components have equal areas; they also have the same shape in the exemplary embodiment according to FIGS. 1 to 4. Each component is a cube with a semicircle-shaped groove 33 or 35, which together form the respective opening 32 to 34. It is crucial that the grooves 33, 35 do not have any undercut, that is, they do not extend inwards in some way. By this means, it is guaranteed that the foot area 22 is not held in a mold-like manner in a groove 33, 35, and thus, the components 44 can be withdrawn from the FIG. 20 without carrying it along with them.

Magnets 46, 48 are imbedded into the cubes as connection elements. The magnets 46 are situated on the front surfaces in the area of the separating line of the layer 26 to 30 and are arranged and polarized such that they guarantee a connection of the two components 44 to the respective layer 26, 28 or 30. In contrast, the magnets 48, which are also imbedded, that is, are not visible, guarantee the connection of the individual layers 26 to 30 to each other. They are not absolutely required. They are also arranged and polarized such that a magnetic connection between the first layer 26 and the second layer 28, as well as between the second layer 28 and the third layer 30, is obtained. Accordingly, the first layer 26 and the third layer 30 each have magnets 48 only on one surface; however, the middle, second layer 28 has magnets 48 on both primary surfaces For a magnetic connection, it is also sufficient that a ferromagnetic part is imbedded on one side, but then a magnetic connected is always obtained without the possibility of a repulsion occurring. In a preferred design, therefore the magnets are arranged and polarized such that an exchange of the layer structure, false arrangement, etc. cannot occur. For this purpose, for example, the magnets 48 of the first layer 26 are situated far outside; the magnetic connection between the second and third layers 28, 30 is situated, in contrast, further near the opening 34 or 36. The magnets are arranged such that no magnetic connection occurs when, for example, the third layer is placed on the first layer. In addition, a repulsion occurs in this case.

In contrast to this, the block 24 in the exemplary embodiment according to FIGS. 5 and 6 is held together purely mechanically. This block is cylindrical; the individual layers 26 to 30 are thus disk-shaped rings. Again, these layers each consist of two components 44. Short, cylindrical pegs 50 project from each component 44 of the second layer 28 and of the third layer 30 to the deeper layer 26 or 28, respectively, which has corresponding recesses 52. In this manner, components 44 lying above one another are connected as one unit by interlocking with one another. The individual components 44 of each layer are adjacent to one another in the area of a separating line 54, without attachment means or adhesives being provided for a special hold. However, such adhesives, as they are formed by the magnets 46, can also be used in the exemplary embodiment according to FIGS. 5 and 6. However, these can fall out when, for example, the second layer is rotated 90 degrees opposite the other layers 26, 30, and the connection of the pegs 50 with the recesses 52 is correspondingly adjusted. The second layer 28 then also produces a connection via the separating line 54, as it is otherwise obtained by the magnets 46.

In a modified design (not shown here), the surfaces of the layers 26 to 30 touching one another are provided with a layer, which prevents a shifting of the layers 26 to 30 against one another, for example, a thin layer made of velvet, or the surfaces are correspondingly roughened. On the other hand, the first and second layers 26, 28 can also be provided with cutouts, for example, segments of a circle with a spandrel over 180 degrees, which are open on the narrow sides of the components 44 and are situated at the location of the magnets 48 (see FIG. 4). According to the respective cutout, shaped parts are situated on the facing bottom surfaces of the second and third layers 28, 30, that is, for example, again segments of a circle with spandrels greater than 180 degrees, which, when the layers 26 to 30 of the block are placed on top of each other, pass into the cutouts of the layers situated below them and prevent the components 44 from being able to be separated from one another in the direction opposite the arrows according to FIG. 4.

In the exemplary embodiment according to FIG. 7, the human FIG. 20 has a foot area 22 in the form of a straight circular cone. Strictly speaking, it is a truncated cone since the cone has a small-plane flattening 43 on its lower side forming the foot surface 42. This is designed such that the FIG. 20 can be mounted vertically with some aptitude on a flat horizontal base, for example, a table surface, without being supported by the layers 26 to 30.

As in the above-described exemplary embodiments, the opening 32 of the bottom layer 26 is designed large, that is, the excess designated as the free space 38 and designed large enough on all sides along the opening 32 that the first layer 26 alone cannot hold the foot area 22 and thus the entire FIG. 20 against tilting. A stop on two opposite parts of the opening 32 does not occur in any angular position. A closing shape or a stop on opposite edges of the opening 32 does not occur in any oblique position of the figure opposite the vertical lines.

The opening 34 of the second layer 28 has, opposite the part of the foot area 22 assigned to it, an air gap 40 which is present on all sides, is smaller than the free space 38 and is designed such that the foot area 22 contained by the first and second layers 26, 28 stacked one above the other can be freely tilted in an angular range ±60° (see FIG. 7) within the openings 32, 34; however, at a greater tilt angle, a closing shape occurs, that is, the foot area stops on the opposite edges of the openings 32, 34. In this case, it is sufficient that exclusively the opening 34 without cooperation with the opening 32 limits the tilting movement in the angular range mentioned.

While the openings 32 and 34 of the two layers 26, 28, respectively, are cylindrical in the exemplary embodiment shown according to FIG. 7, the opening 36 of the third layer 30 in the bottom area is cylindrical, but in the top area fits the conical form of the foot area 22 exactly. By this means, an exact fit occurs, by means of which the foot area contained by the openings 32 to 36 of the three layers 26 to 30 stacked one above the other can no longer be tilted. A tilting angle by a smaller degree of angle, for example, ±3° or even ±10° is permissible within the tolerances. In general, the opening 36 should not have any dimension smaller than specified opposite the part of the foot area 22 assigned to it, so that it is always guaranteed that the human FIG. 20 stands with its foot area 22 on the same vertical support surface, on which the bottom layer 26 also lies.

The exemplary embodiment of FIG. 8 shows a FIG. 20 with a foot area in the form of a straight pyramid with a square base. This design should substantiate that a deviation from the preferred rotationally symmetrical design of the foot area 22 is possible. The foot area 22 can also be designed as a pyramid with other bases, for example, the base of a triangle, a pentagon, a hexagon, with an oval base, etc. The shape of the foot area is basically open; it should be designed such that the FIG. 20 is recognized as a human figure as much as possible The word convex means crowned, rounded off or curved downwards.

What we claim is:

1. Demonstration device, characterized by a human figure, which has a head area and a foot area which has a foot surface that is convex or pointed downwards, and at least two blocks, the height of at least two blocks being equal to the height of the foot area, that can be stacked one above the other to form plural layers, and each block has a recess opening upwards wherein the openings of the layers are aligned for insertion of the foot area through the openings of all the stacked layers, whereby the opening of the first layer has an area larger than the area of the lower part of the foot area contained therein, wherein when only the first layer is placed around the figure, the figure does not resist tipping and the opening of the uppermost layer is substantially equal in area to the part of the foot area corresponding to it such that the foot area contained by the openings of the layers stacked one above the other cannot be tilted in an angular range greater than plus or minus 10 degrees from the vertical lines, and in that, each layer is comprised of at least two components, which have an undercut-free groove on one side, and these grooves form the opening when the components or a layer are put together.

2. Demonstration device in accordance with claim 1, characterized in that three layers are provided wherein a second layer is located between the first layer and the uppermost third layer, said second layer having an opening confining the recess, that an air gap remains on all sides between the opening of the second layer and the corresponding part of the foot area, which is designed such that the foot area contained by the first and second layers which are stacked one above the other can be tilted in an angular range smaller than ±80°, opposite the vertical lines within the openings; however, at a greater tilt angle, a the foot area contacts the openings and the foot area, and that also the second layer is comprised of at least two components, which have an undercut-free groove on one side, and these grooves form the opening when the components of a layer are put together.

3. Demonstration device in accordance with claim 2, characterized in that the foot area is rotationally symmetrical and the recess formed by the three openings is cylindrical.

4. Demonstration device in accordance with claim 3, characterized in that the foot area up to the level of the first layer is smaller than a semicircle with the radius of the opening of the first layer, and the first layer has a height which is smaller that this radius.

5. Demonstration device in accordance with claim 1, characterized in that the layers have equal heights.

6. Demonstration device in accordance with claim 2, characterized in that each layer is, in each case, comprised of two components of equal area, which are adjacent to each other on a separating line which runs on a diametrical line of the opening.

7. Demonstration device in accordance with claim 6, characterized in that the components of each layer and preferably the components of all the layers have the same shape.

8. Demonstration device in accordance with claim 1, characterized in that the block is a straight prism.

9. Demonstration device in accordance with claim 6, characterized in that the individual layers have connection means which make it possible to connect the layers with one another.

10. Demonstration device in accordance with claim 9, characterized in that connection means are provided on the components rear the separating line.

11. Demonstration device in accordance with claim 2 characterized in that the layers have equal heights.

12. Demonstration device in accordance with claim 2 characterized in that the individual layers have connection means which make it possible to connect the layers with one another.

* * * * *

UNITED STATES PATENT AND TRADEMARK OFFICE
CERTIFICATE OF CORRECTION

PATENT NO. : 5,071,355
DATED     : December 10, 1991
INVENTOR(S) : Karl-Werner Schmitz and Manfred Bergfelder It is certified that error appears in the above-identified patent and that said Letters Patent is hereby corrected as shown below:

Column 6, line 25, "faces For" should read --faces. For--.

Column 6, line 29, "therefore the" should read --therefore, the--.

Column 8, line 41, "and the foot area" should be deleted.

Signed and Sealed this

First Day of June, 1993

Attest:

Attesting Officer

MICHAEL K. KIRK

Acting Commissioner of Patents and Trademarks